(12) United States Patent
Nakatani et al.

(10) Patent No.: US 6,335,801 B1
(45) Date of Patent: Jan. 1, 2002

(54) FACSIMILE APPARATUS FOR TRANSMITTING COLOR IMAGE DATA DISPLAYED ACCORDING TO COMBINATION OF SPECIFIC CODEWORDS

(75) Inventors: Munehiro Nakatani, Toyohasi; Masamichi Sugiura, Toyokawa; Hideo Muramatsu, Shinshiro, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 07/964,342

(22) Filed: Oct. 21, 1992

(30) Foreign Application Priority Data

Oct. 25, 1991 (JP) .................................... 3-307102
Jul. 7, 1992 (JP) .................................... 4-179871

(51) Int. Cl.[7] .................................... G06K 9/36
(52) U.S. Cl. .................................... 358/261.1; 382/245
(58) Field of Search .................................... 358/261.1, 261.2, 358/261.3, 316, 432

(56) References Cited

U.S. PATENT DOCUMENTS 4,121,259 A * 10/1978 Preuss et al. ................. 358/261
4,363,036 A * 12/1982 Subramaniam ............... 258/261

FOREIGN PATENT DOCUMENTS

JP 61-238171 10/1986
JP 62-139474 6/1987

* cited by examiner

Primary Examiner—Bernard Roskoski
(74) Attorney, Agent, or Firm—Sidley Austin Brown & Wood

(57) ABSTRACT

With facsimile apparatuses wherein color image data is coded, a facsimile on a calling side codes image data by replacing the image data with a codeword indicative of a white run-length or a black run-length, represents color information by combining specific codewords among the codewords and represents image data including color image only by codewords by combining the coded image data and the color information. A facsimile on a called side receives transmitted image data, determines color information represented by a combination of specific codewords among the codewords in the received image data, and outputs image data as specific color image when the color image is determined.

18 Claims, 16 Drawing Sheets

(a) WHITE LINE | EOL | WHITE 1728 | WHITE 0 |

(b) BLACK LINE | EOL | WHITE 0 | BLACK 1728 | BLACK 0 |

(c) RED LINE | EOL | WHITE 0 | BLACK 0 | WHITE 0 | BLACK 1728 | BLACK 0 |

COLOR INFORMATION CI

L1
| EOL | WHITE 320 | WHITE 4 | BLACK 1152 | BLACK 10 | WHITE 192 | WHITE 50 |

WHITE 324 DOTS — BLACK 1162 DOTS — WHITE 242 DOTS

L2
| EOL | WHITE 1344 | WHITE 10 | BLACK 0 | WHITE 0 | BLACK 60 | WHITE 320 | WHITE 4 |

WHITE 1354 DOTS — COLOR INFORMATION (COLOR CONVERSION TO RED) — RED 60 DOTS — WHITE 324 DOTS

FACSIMILE APPARATUS FOR TRANSMITTING COLOR IMAGE DATA DISPLAYED ACCORDING TO COMBINATION OF SPECIFIC CODEWORDS

BACKGROUND OF THE INVENTION

1. Field of the Invention

The present invention relates to facsimile apparatuses, and more particularly, to a coding system for use in bandwidth compression of a facsimile signal.

2. Description of the Related Art

Various coding systems have been conventionally proposed for bandwidth compression of a facsimile signal, among which an MH (Modified Huffman) system as a standardized one-dimensional coding and an MR (Modified READ) system as a standardized two-dimensional coding are recommended by CCITT.

In the MH system, for example, image data of a line (line data) of a white pixel run or a black pixel run with L=64n+Lr (n: integer) is represented by a combination of terminating codes comprised of 64 separately determined codewords, and make-up codes determined corresponding to n (1, 2, 3 . . . ).

A facsimile apparatus is known which is structured to be capable of sending and receiving, in addition to usual black and white images (monochrome images), color images (mixed color images) such as plural color images, for example, two-color image of black and red as of a sealed document or full-color images.

A conventional facsimile apparatus applicable to color images separates colors of image data of one line, codes line data of each color and arranges and transmits the obtained coded data of each color in time sequence, wherein bandwidth compression of image data is executed under a system which is unique to a manufacturer and different from the above-described standardized coding system.

In a case of color image transmission, a conventional facsimile apparatus applies an NSF signal (nonstandard function discrimination signal) to escape from a standard mode to a special mode. Therefore, communication is not possible with most facsimile apparatuses not provided with such a special mode.

Memory transmission is also widely used in which image of an original is read prior to calling and stored as coded data in a memory in advance and the code data is read from the memory after the calling and transmitted to a destination side (called party). Since it is not possible in the memory transmission to detect whether a facsimile apparatus on a transmission destination side is provided with a special mode or not at the time of reading image of an original, if image data transmission is found to be impossible after starting transmission, the transmission is stopped to abandon the coded data stored in the memory and the original image is read again in a normal mode, which is time consuming.

SUMMARY OF THE INVENTION

An object of the present invention is to enable coding involving no useless operation in transmission under a color image data coding system.

Another object of the present invention is to achieve normal transmission under a color image data coding system irrespective of a destination facsimile apparatus's capability of receiving color image.

In order to achieve the above-described objects, a coding system of the present invention relates to a color image data coding and includes the steps of coding image data by replacing the image data by codewords representing a white or black run-length, representing color information by combing specific codewords among the codewords and by combining the coded image data and the color information to represent image data including color image by codewords only.

Under the coding system as structured above, image data including color image is represented only by codewords, so that quick image data transmission is possible irrespective of reception function of a destination apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
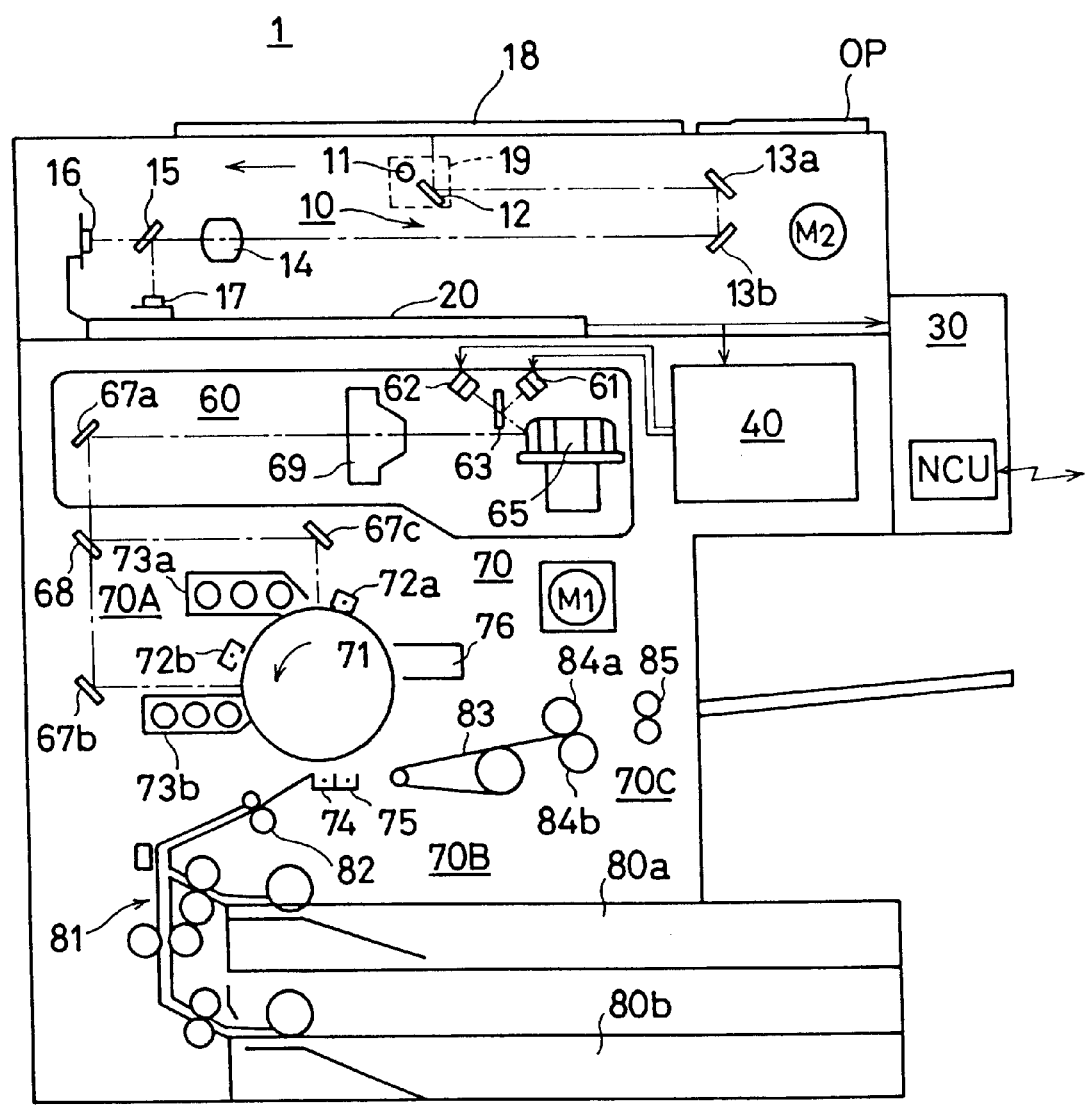
FIG. 5 is a sectional front elevation illustrating an entire structure of a facsimile apparatus according to the first to the fourth embodiments of the present invention.
Figure 6:
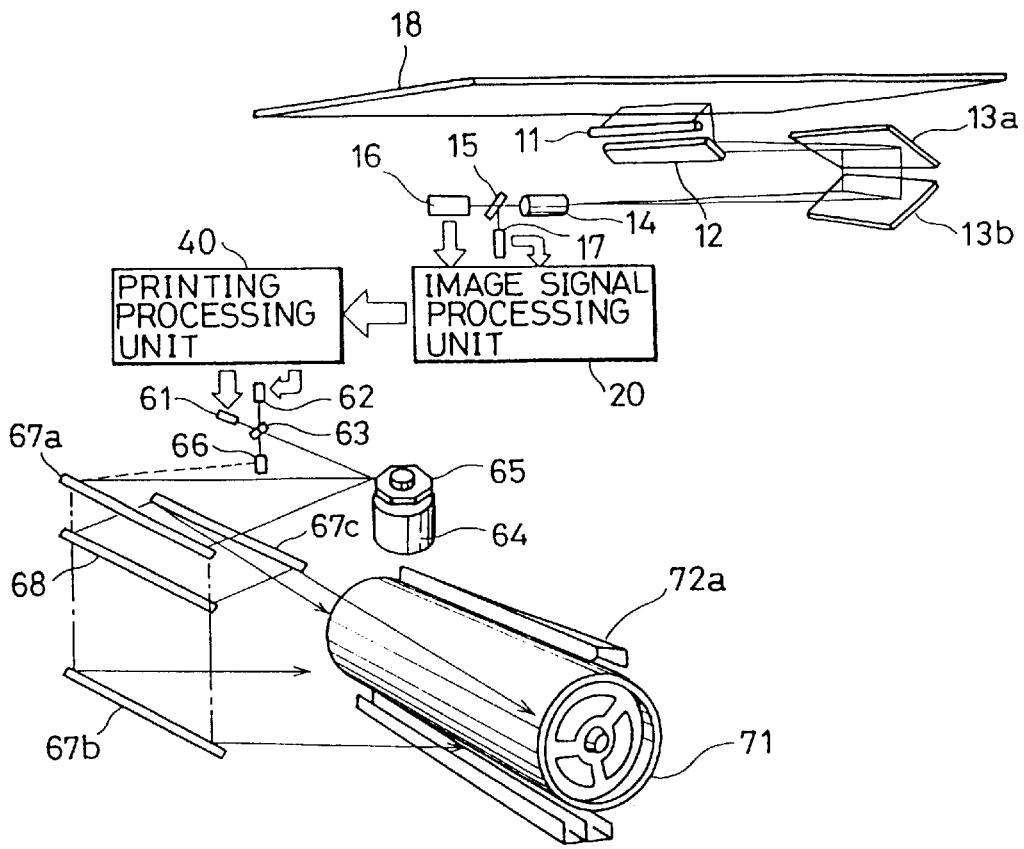
FIG. 6 is a perspective view schematically showing a structure of a main part of FIG. 5.

FIG. 5 is a sectional front elevation showing the entire structure of a facsimile apparatus 1 employing a coding system according to the present invention and FIG. 6 is a perspective view schematically showing the structure of a main part of FIG. 5.

In these figures, the facsimile apparatus 1 includes a scan system 10 for reading an original and converting the same into an electric signal, an image signal processing unit for processing an image signal sent from the scan system 10, a facsimile communication unit 30 for sending and receiving image information to and from a communication destination apparatus (not shown), a printing processing unit 40 for driving two semiconductor lasers 61 and 62 based on image data applied from the image signal processing unit 20 or the facsimile communication unit 30, an optical system 60 for guiding two laser beams from the semiconductor lasers 61 and 62 to different exposure positions on a photoreceptor drum 71, and an image formation system 70 for developing a latent image formed by exposure, transferring and fixing the image onto paper as a transfer body, and the facsimile apparatus is capable of sending and receiving and copying color image with two colors mixed (two-color image).

The scan system 10 includes an exposure lamp 11 and a mirror 12 attached to a scanner 19 which moves under a platen glass 18, fixed mirrors 13a and 13b, a condense lens 14, a dichroic mirror 15, photoelectric conversion elements 16 and 17 of a CCD array etc. and a scan motor M2.

The dichroic mirror 15 reflects a specific color light, for example, a red light out of reflected lights from an original and passes a light with color complementary to the specific color light. The photoelectric conversion elements 16 and 17 individually convert non-specific color image mainly of black and specific color (red) image of the original into electric signals.

The image signal processing unit 20 processes image signals provided from the two photoelectric conversion elements 16 and 17, identifies respective pixels of the original image with first color and second color and outputs image data with color data to the printing processing unit 40.

The printing processing unit 40 allots the received image data having color data to the two semiconductor lasers 61 and 62 and delays image data to be applied to the semiconductor laser 62 according to a difference between exposure positions corresponding to the two semiconductor lasers 61 and 62.

The optical system 60 includes a dichroic mirror 63 for combining two laser beams from the semiconductor lasers 61 and 62, a polygon mirror 65 for deflecting a combined laser beam, a main lens 69, a reflecting mirror 67a, a dichroic mirror 68 for separating the combined laser beam into the original two laser beams and reflecting mirrors 67b and 67c.

The image formation system 70 includes a development and transfer system 70A, a transport system 70B and a fixing system 70C and it is structured such that image with two color mixed can be formed on a sheet of paper by a first electrophotographic process, that is, that two color images can be formed simultaneously.

More specifically, the development and transfer system 70A includes the photoreceptor drum 71 to be driven to rotate counterclockwise in the figure, a first corona charger 72a, a first developing unit 73a, a second corona charger 72b, a second developing unit 73b, a transfer charger 74, a separation charger 75 and a cleaning unit 76, all of which are sequentially arranged from the upperstream of the rotation direction.

The first developing unit 73a stores two-component developer made of red toner corresponding to the second color and carrier, while the second developing unit 73b stores a two-component developer made of black toner corresponding to the first color and carrier.

The transport system 70B includes cassettes 80a and 80b for storing sheets of paper, a paper guide 81, a timing roller 82 and a transport belt 83. The fixing system 70C includes fixing rollers 84a and 84b and a discharging roller 85.

Figure 7:
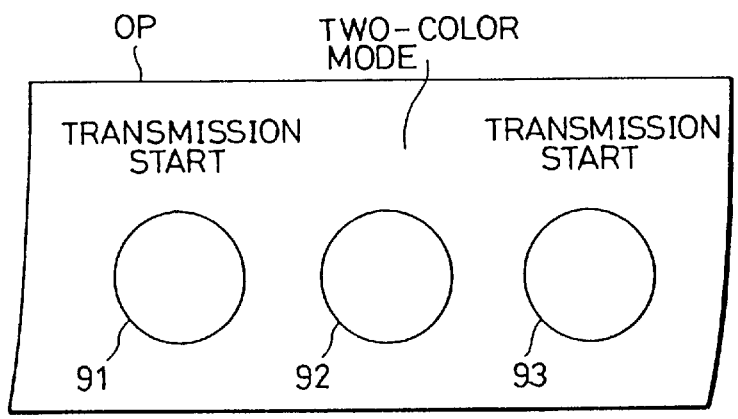
FIG. 7 is a plan view showing a main part of an operation panel shown in FIG. 5.

An operation panel OP is placed on the upper surface of the facsimile apparatus 1. Arranged on the operation panel OP are a start key 91 for starting transmission at the time of facsimile communication, a two-color mode key 92 for selecting a two-color mode wherein an original is read as two-color image, and a transmission mode selection key 93 for switching transmission modes as shown in FIG. 7.

Figure 8:
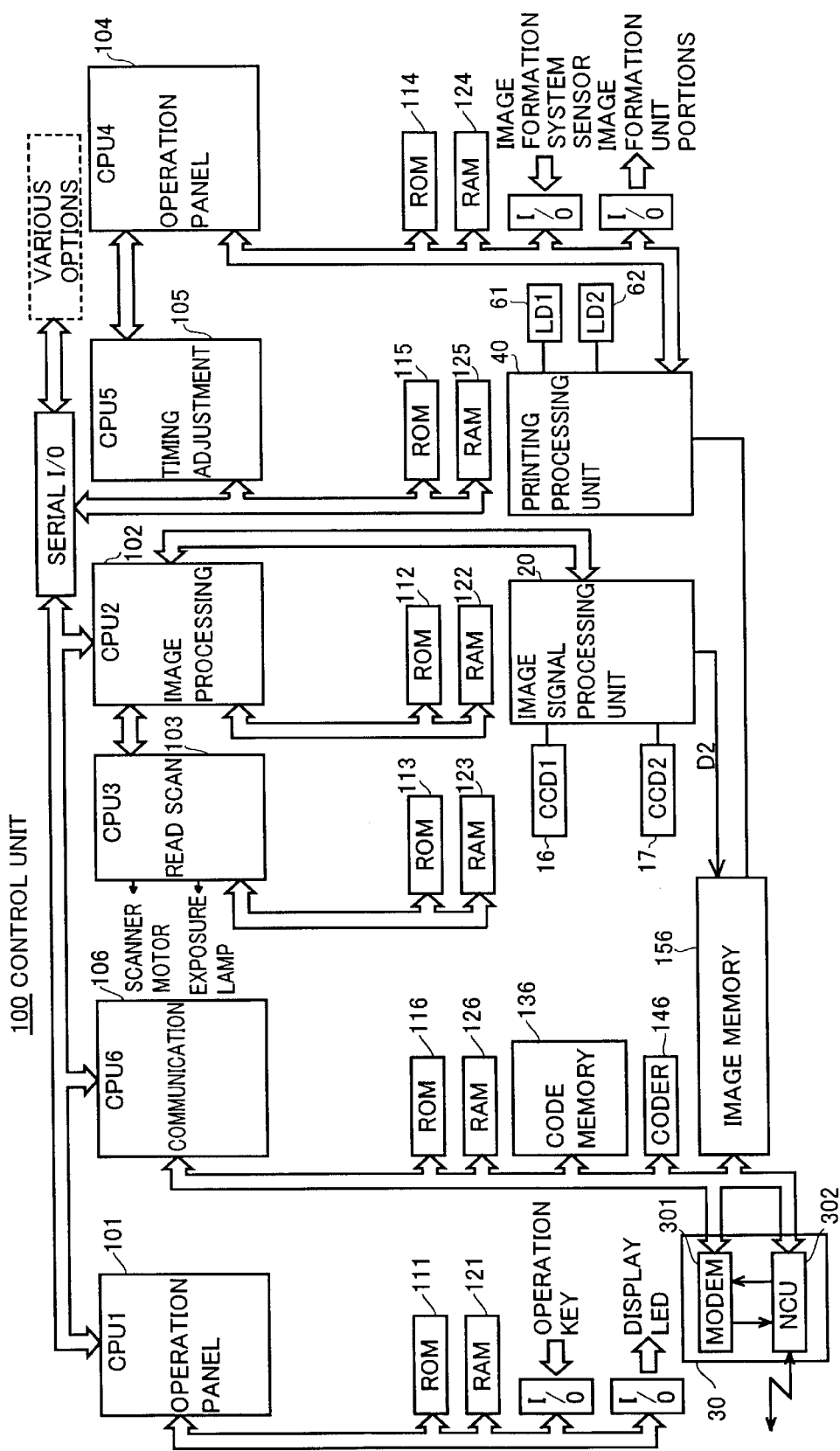
FIG. 8 is a block diagram showing the structure of a control unit of the facsimile apparatus shown in FIG. 5.

FIG. 8 is a block diagram showing the structure of a control unit 100 of the facsimile apparatus 1.

The control unit 100 is mainly structured by six CPUs 101, 102, 103, 104, 105 and 106, the respective CPUs 101–106 being provided with ROM 111, 112, 113, 114, 115 and 116 for storing programs and RAM 121, 122, 123, 124, 125 and 126 as work areas for program execution, respectively.

The CPU 101 controls input of signals from various operations keys on the operation panel OP and display. The CPU 102 controls the respective portions of the image signal processing unit 20 and the CPU 103 controls drive of the scan system 10. The CPU 104 controls the printing processing unit 40, the optical system 60 and the image formation system 70, while the CPU 105 executes processings for adjusting an overall timing of the control unit 100 and for setting operation modes.

The CPU 106 controls a code memory 136, a coder 146 and an image memory 156 to execute processings such as image data compression related to facsimile communication.

The code memory 136 has a line memory for two lines and a coding buffer memory.

The coder 146 compresses image data for transmission stored in the image memory 156 or expands received data and writes the data in the image memory 156. The coder 146, which is being stored a code table of the MH system, executes a compression or expansion processing under the MH system in a normal mode, and under the coding system of the present invention (hereinafter referred to as the "the present invention system") in a two-color mode.

The image memory 156 is capable of storing image data D2 read from one page of an A3 original in a fine mode [(8 pixels/mm)×(7.7 pixels/mm)] and is provided with sign bits for storing color data for each line. The color data serves to discriminate between black and red in the two-color mode. The sign bit of "0" represents black and that of "1" represents red. In compression, image data is converted into compressed data (coded data) according to a sign bit and in recording (printing), it is recorded as a color corresponding to the sign bit.

Figure 9:
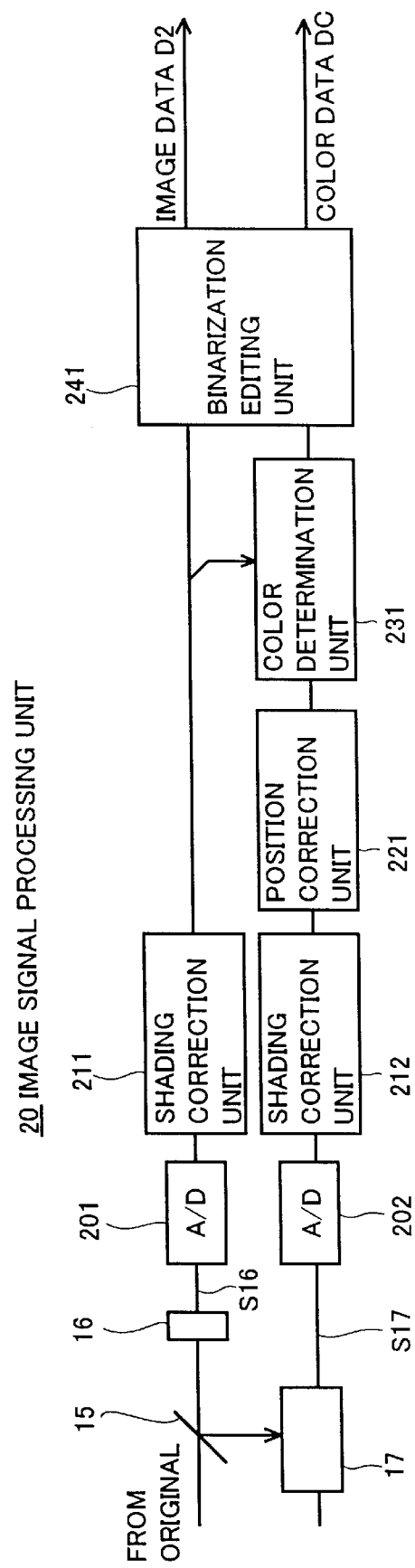
FIG. 9 is a block diagram showing the structure of an image signal processing unit of FIG. 8.

FIG. 9 is a block diagram of the image signal processing unit 20.

The image signal processing unit 20 includes A/D converters 201 and 202 for quantitizing respective photoelectric conversion signals S16 and S17 of the photoelectric conversion elements 16 and 17 into image data of predetermined numbers of bits, shading correction units 211 and 212 for correcting an uneven light distribution of the exposure lamp 11 and a sensitivity difference between the respective pixels of the photoelectric conversion elements 16 and 17, a position correction unit 221 including a line memory for correcting a position shift of each image data in a subscanning direction, a color determination ROM 231 for determining color of a pixel of an original according to each image data and a binarization editing unit 241 for outputting image data D2 which is binarization of image data corresponding to the photoelectric conversion signal S16 and color data DC corresponding to the data D2.

Figure 10:
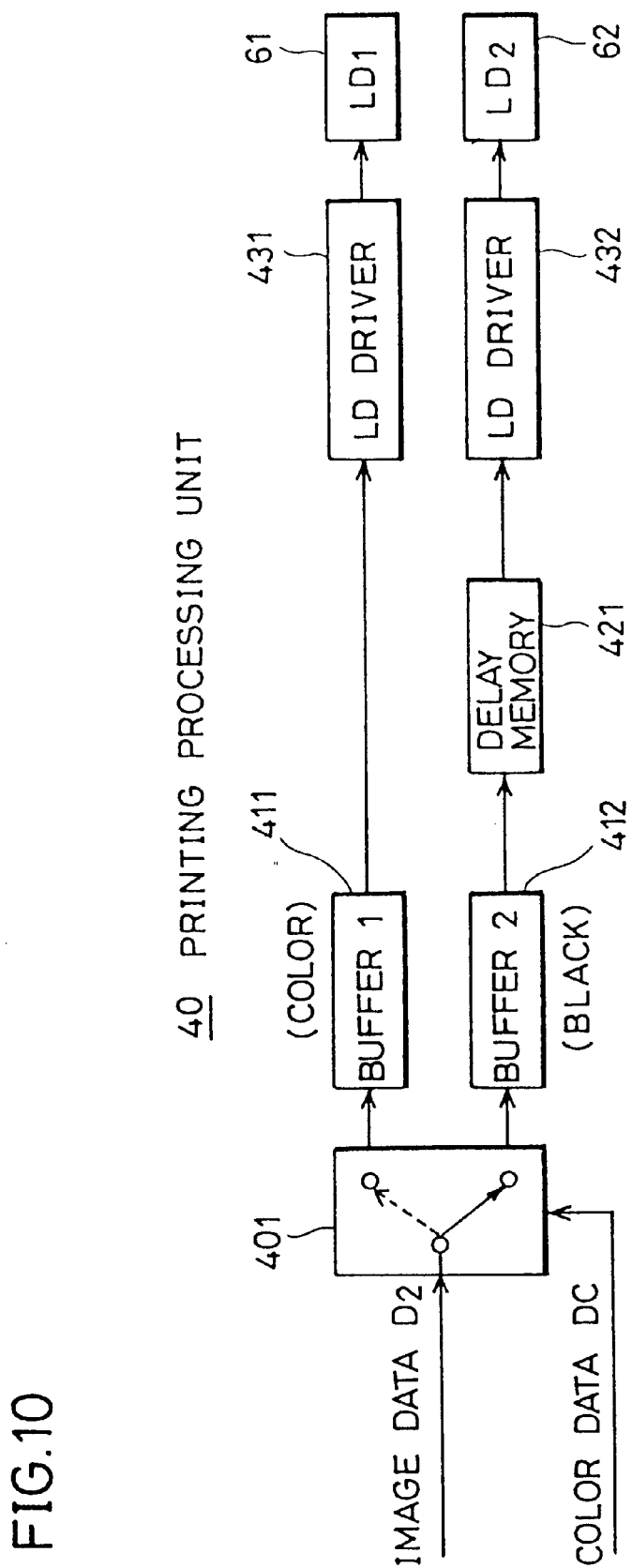
FIG. 10 is a block diagram showing the structure of a printing processing unit of FIG. 8.

FIG. 10 is a block diagram of the printing processing unit 40.

The printing processing unit 40 includes a color separation selector 401 for switching an output destination of the image data D2 based on the color data DC, two buffers 411 and 412, a delay memory 421, and LD drivers 431 and 432 for driving the semiconductor lasers 61 and 62.

When the image data D2 corresponds to the second color (red), the image data D2 is sent from the color separation selector 401 to the LD driver 431 through the buffer 411 and responsively the semiconductor laser 61 is controlled to drive. On the other hand, when the image data D2 corresponds to the first color (black), the image data D2 is sent to the LD driver 432 through the buffer 412 and the delay memory 421 due to delay corresponding to a difference in an exposure position on the photoreceptor drum 71 as described above, and responsively the semiconductor laser 62 is controlled to drive.

Thus structured facsimile apparatus 1 performs facsimile communication by a memory communication method. More specifically, with the facsimile apparatus 1, scan for reading an original is done prior to calling and image data D2 output from the image signal processing unit 20 is stored in the image memory 156 (see FIG. 8), and in parallel, data compressed by the coder 146 under the MH system or the present invention system is stored in the code memory 136 as image information to be transmitted.

Thereafter, an NCU (Network Control Unit) 302 of the facsimile communication unit 30 calls a destination apparatus (the apparatus at a reception side) and when the destination side becomes ready for reception, a modem 301 modulates compressed data read from the code memory 136 and sends the modulated data to a communication line.

Figures 1, 2:
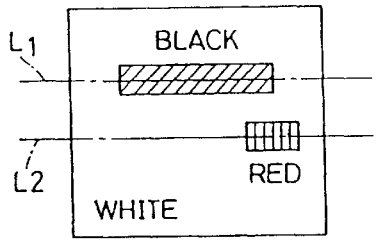
FIG. 1 is a diagram illustrating a coding system according to a first embodiment of the present invention.
FIG. 2 is a diagram illustrating a coding system according to a second embodiment of the present invention.

FIG. 1 is a diagram illustrating one example of a coding system according to the present invention (system of the present invention).

The present invention system uses codewords (coded data) for use in a MH (Modified Huffman) system, which is a standardized one-dimensional coding system, to represent color information by a combination of specific codewords among the codewords. A method of arranging such codewords also meets requirements of the MH system. As a result, data thus obtained by compressing image data of two-color image under the present invention system can be restored as image data of monochrome image under the MH system. Conversely, data obtained by compressing image data of monochrome image under the MH system can be stored as image data of monochrome image by the present invention system.

More specifically, under the present invention system, one line of white (white line) is represented by an EOL (end of line) code followed by a codeword indicative of a white run "1728" (denoted by "white 1728") and a codeword indicative of a white run "0" (denoted by "white 0"), as shown in FIG. 1(a). One line of black (black line), as shown in FIG. 1(b), is represented by an EOL code followed by a codeword indicative of a white run "0", a codeword indicative of a black run "1728" (denoted by "black 1728") and a codeword indicative of a black run "0" ("black 0").

As shown in FIG. 1(c), one line of red (red line) is represented by an EOL code followed by a codeword indicative of a white run "0", a code word indicative of a black run "0", a codeword indicative of a white run "0", a codeword indicative of a black run "1728" and a codeword indicative of a black run "0". A FILL code or the like, though not shown, may be inserted if necessary.

It is determined herein that a sequence of codewords indicative of a white run "0" and codewords indicative of a black run "0" ("white 0 black 0") represents color information CI and that a line having the color information CI is a red line. Since the color information CI does not appear in compressed data under an ordinary MH system, it can be uniquely determined as color information, and when the color information CI is expanded under the MH system, the information is converted into empty image data, that is, with "0", so that the data is simply ignored. Therefore, the two systems are compatible with each other.

In this case, therefore, a codeword indicative of a black run "1728" subsequent to an appearance of the color information CI is supposed to indicate a red dot of the same length. In order to represent a plurality of red lines, even if the red lines are continuous, the color information CI is inserted following the EOL code for each red line.

On the other hand, it can be also determined that the color information CI is inserted every time a red line and a black line alternate with each other. By doing so, when a line of the same color continuous, the color information CI is inserted into a first line only as shown in FIG. 1(c) but not in the following lines, whereby the number of codewords is reduced to improve a compression rate.

When white dots and black dots or white dots and red dots appear in one line, color of the line is designated by the color information CI and a codeword indicative of a white run and a codeword indicative of a black run are adequately arranged to represent a run-length and a position.

In addition, with the color information CI denoted by "white 0 black 0" as described above, a codeword of a white run follows the EOL code without fail under the MH system. It is therefore possible in many cases to use the white run also as the first "white 0" of the color information CI, whereby the number of codewords can be reduced.

However, it is naturally possible to vary the color information CI itself. The following is a description of the color information CI denoted by "black 0 white 0".

FIG. 2 is a diagram for illustrating another example of a coding system according to the present invention.

In FIG. 2, the color information CI is denoted by a sequence of "black 0 white 0", and the 60 red dots in a line L2 are represented by color information "black 0 white 0" and the subsequent codeword indicative of a black run "60" ("black 60").

Although in the above-described example, color designation is carried out by a sign bit for each line, compression and expansion under the present invention system are also possible when color designation is made for each pixel, on which a brief description will be made with reference to FIG. 3. In this case, for example, two frames of the image memory 156 should be provided, one of the two frames storing color data on a pixel basis.

Figure 3:
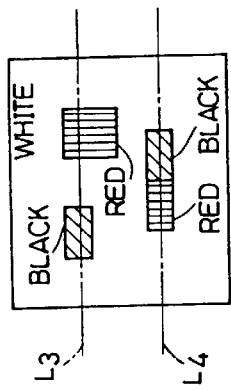
FIG. 3 is a diagram illustrating a coding system according to a third embodiment of the present invention.
Figure 3:
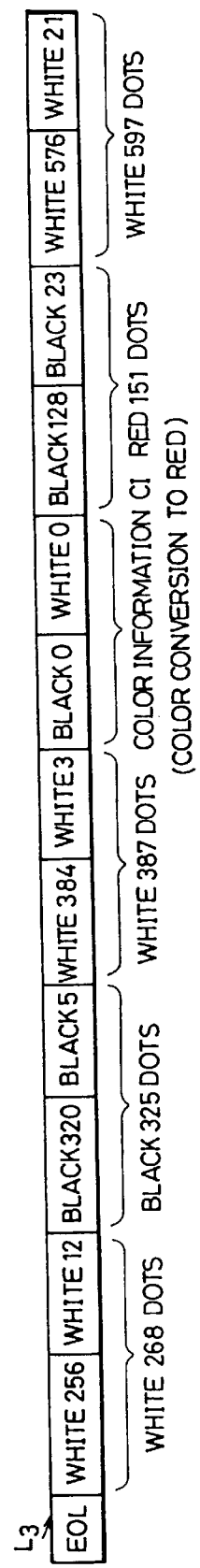
Figure 3:
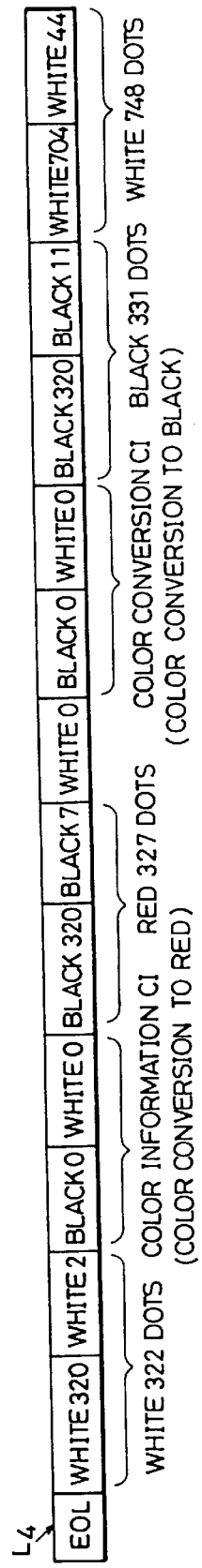

FIG. 3 is a diagram illustrating a further example of the coding system according to the present invention.

In FIG. 3, the color information CI is represented by a sequence of "black 0 white 0", and the 151 red dots in a line L3 are represented by color information "black 0 white 0" meaning color conversion from red to black or from black to red and codewords indicative of the following black run "128" and black run "23".

The 327 red dots in a line L4 are represented by color information "black 0 white 0" meaning color conversion and codewords indicative of the following black runs "320" and "7", and the subsequent 331 black dots are represented by color information "black 0 white 0" meaning color conversion and codewords indicative of the subsequent black runs "320" and "11". In other words, in this case, color conversion between black and red is made each time color information appears.

Figure 4:
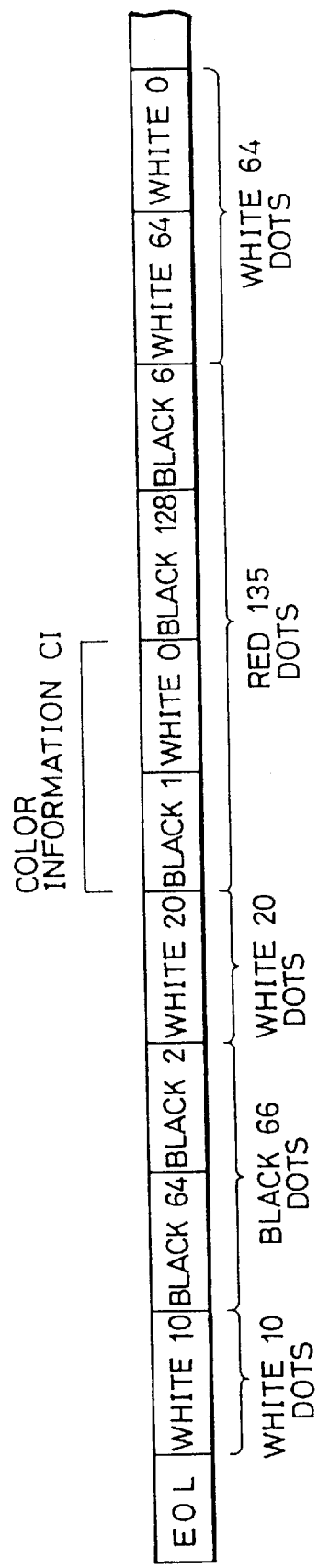
FIG. 4 is a diagram illustrating a coding system according to a fourth embodiment of the present invention.

It is also possible to use codes other than a white run "0" and a black run "0" for the color information CI. For example, as shown in FIG. 4, the color information CI may be represented by a code word indicative of a black run "1" and a codeword indicative of a white run "0", and a red run "x" may be represented by a sequence of the color information CI and a codeword indicative of a black run "x−1" (x: integer indicative of a run-length). In other words, in this case, the black run "1", which is a component of the color information CI, is regarded as a component of a red run after the color conversion and the remaining red run is represented subsequently to the white run "0". In the example shown in FIG. 4, in order to represent 135 red dots, that is, with x=135, a black run "x" is represented by a black run "1", a white run "0", a black run "128" and a black run "6".

Operation of the CPU 106 for controlling facsimile communication will be described with reference to flow charts in the following.

Figure 11:
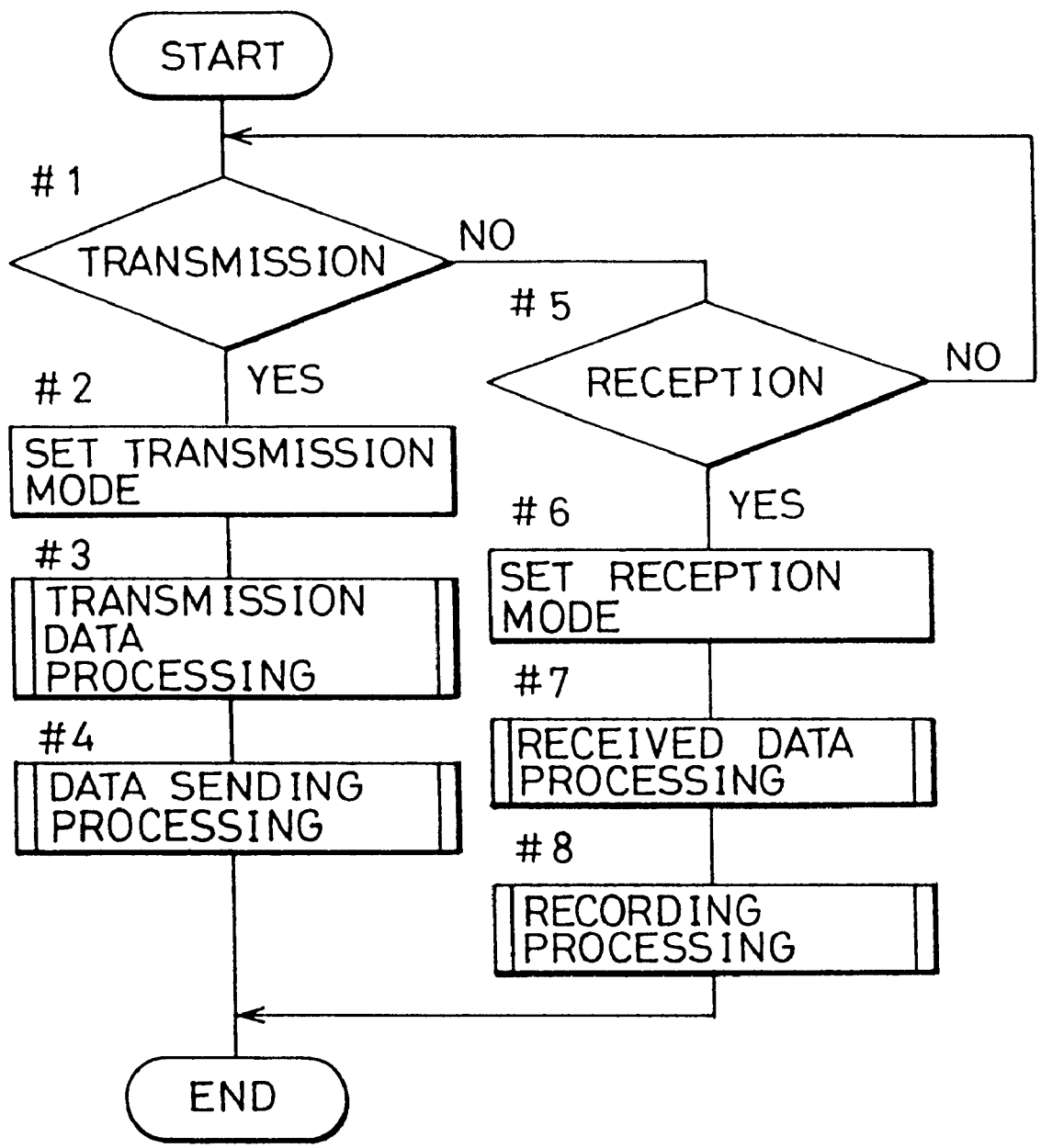
FIG. 11 is a main flow chart showing schematic operations of a CPU for controlling facsimile communication of FIG. 8.

FIG. 11 is a main flow chart showing a schematic operation of the CPU 106 of FIG. 8.

In transmission (YES at #1), a transmission mode is set (#2) as an operation mode to sequentially execute a transmission data processing (#3) and a data transmission processing (#4).

In reception, a reception mode is set as an operation mode to sequentially carry out received data processing and a recording processing (#5–#8).

Figure 12:
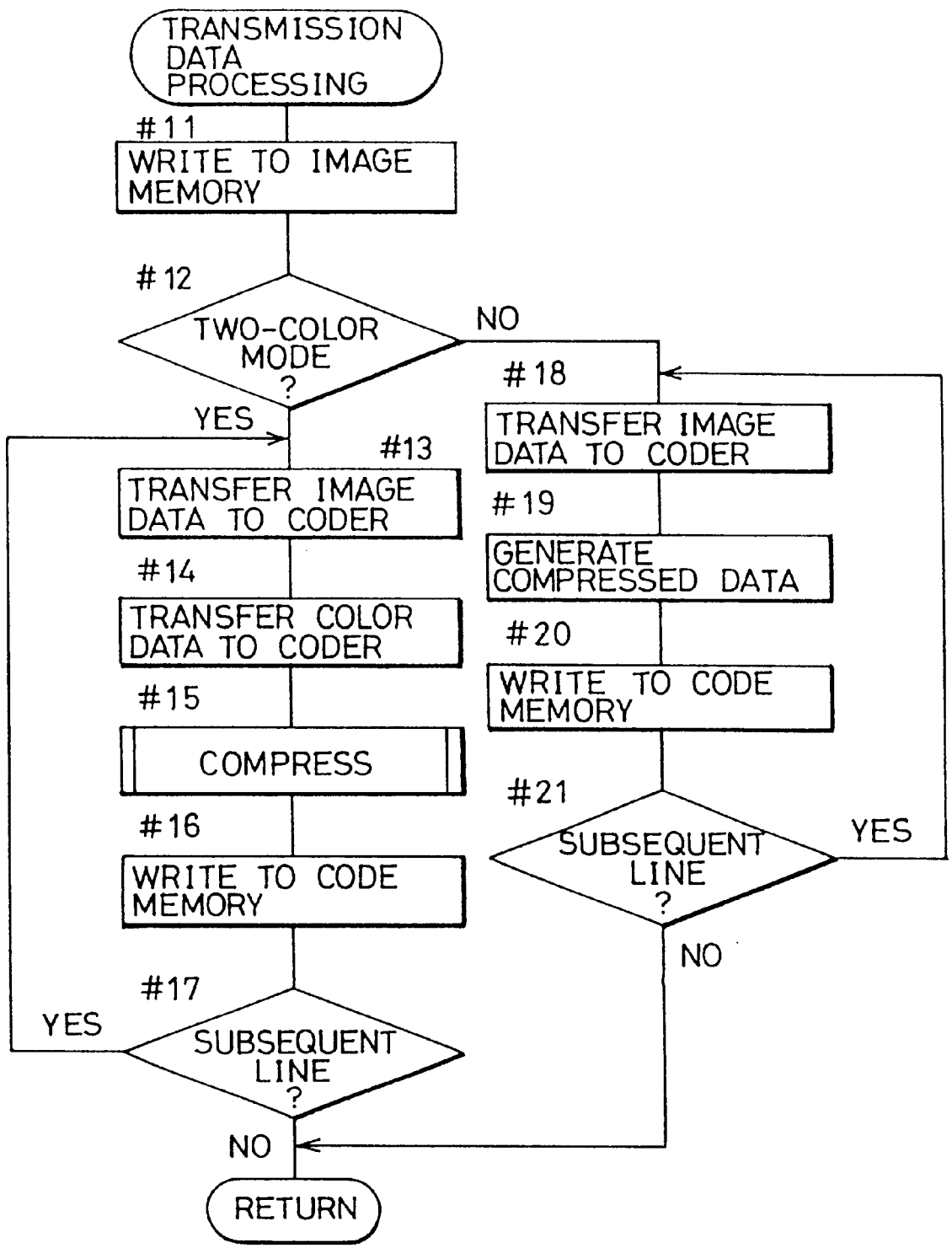
FIG. 12 is a flow chart showing specific contents of a transmission data processing routine of FIG. 11.

FIG. 12 is a flow chart showing the specific contents of the transmission data processing of FIG. 11.

First, image data of one page transmitted from the image signal processing unit 20 is written for each pixel in the image memory 156 (#11).

Then, in a two-color mode (YES at #12), image data of one line is transferred from the image memory 156 to the coder 146 (#13) and color data is transferred to the decoder 146 (#14).

Then, a compression processing is carried out under the present invention system (#15), obtained compressed data is written in the code memory 136 (#16) and the same processings are sequentially performed for image data of the subsequent line (YES at #17).

Not in the two-color mode, the image data of one line is transferred from the image memory 156 to the coder 146 (#18), a compression processing is carried out under the MH system to generate compressed data (#19), the obtained compressed data is written in the coding memory 136 (#20) and the same processings are sequentially carried out for image data of a subsequent one line (YES at #21).

Figure 13:
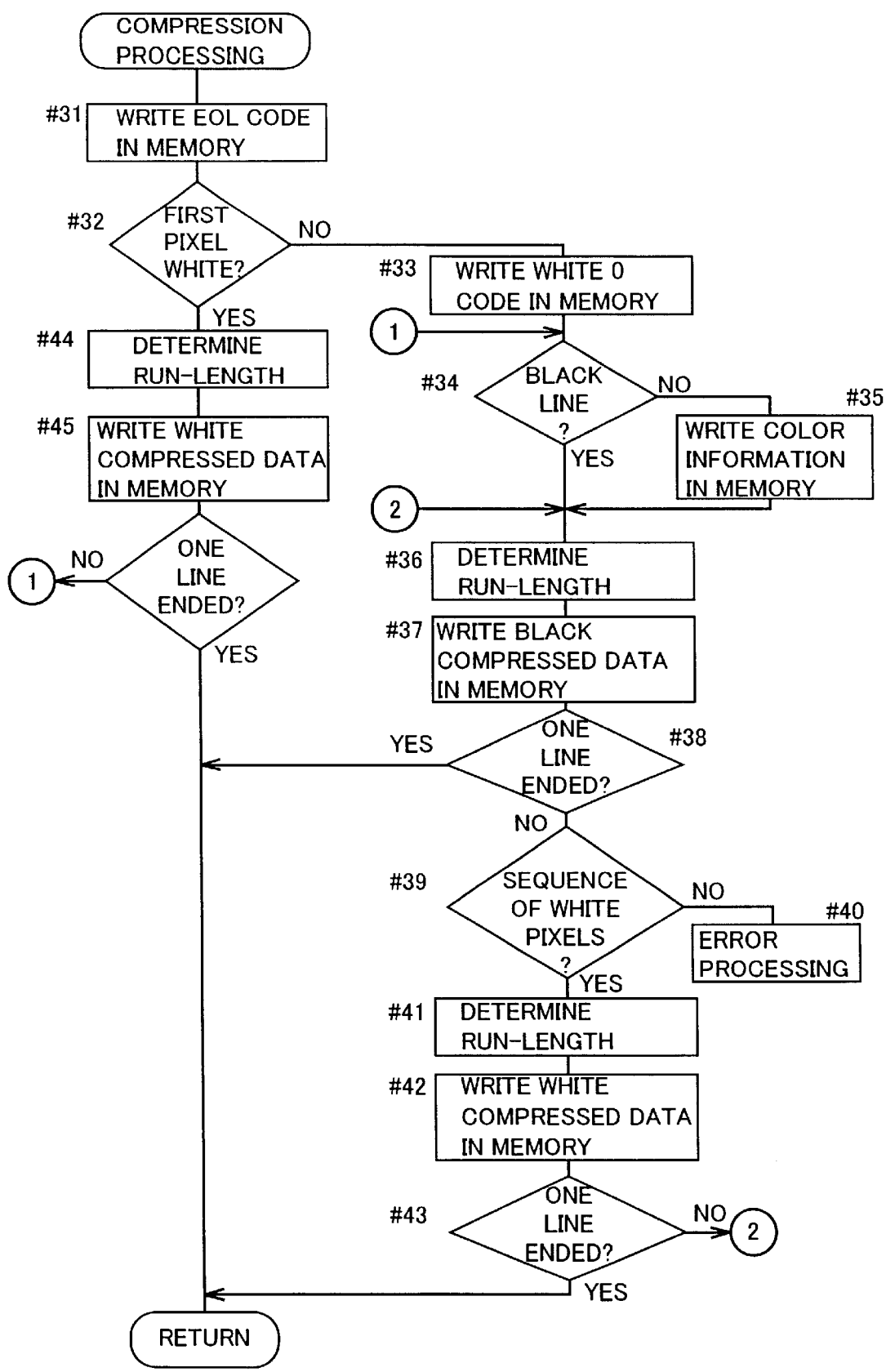
FIG. 13 is a flow chart showing specific contents of a compression processing routine of FIG. 12.

FIG. 13 is a flow chart showing the specific contents of the compression processing of FIG. 12, which flow chart corresponds to the example of the coding system shown in FIG. 2.

First, an EOL code is generated and written in the coding memory 136 (#31). Then, determination is made whether a first pixel is a white pixel (#32). If it is not a white pixel, compressed data indicative of a white run "0" is read in the code memory 136 in order to start with a codeword (compressed data) indicative of a white run (#33).

Then, color data according to a sign bit is checked to determine whether the image data represents a black line or not (#34).

When it is a black line (YES at #34), a sequence of pixels is checked and a run-length thereof is determined (#36) and then compressed data of the black run is generated based on the code table of the MH system, which data is written in the code memory 136 (#37).

When it is not a black line (NO at #34), the color information CI ("black 0 white 0", for example) is written in the coding memory 136 (#35) and a run-length is determined (#36) and compressed data of the black run is generated and written in the code memory 136 (#37).

Then, determination is made whether a compression processing for image data of one line is finished (#38). If the compression processing of the image data of the one line is finished, the flow returns and otherwise determination is made whether the subsequent pixel is a sequence of white pixels (#39). If it is not of white pixels, an error processing is performed (#40). When it is of white pixels, compressed data of a white run is generated based on the code table of the MH system after determining a run-length of the sequence (#41), and the data is written in the code memory 136 (#42). Such operations will be repeated until compression of image data of one line is finished (#43).

On the other hand, if the first pixel is a white pixel (YES at #32), compressed data of a white run is generated based on the code table of the MH system after determining a run-length (#44), and the data is written in the code memory 136 (#45). If the processing for the image data of one line is not finished, the flow proceeds to step #34 and if it is finished, the flow returns.

Figure 14:
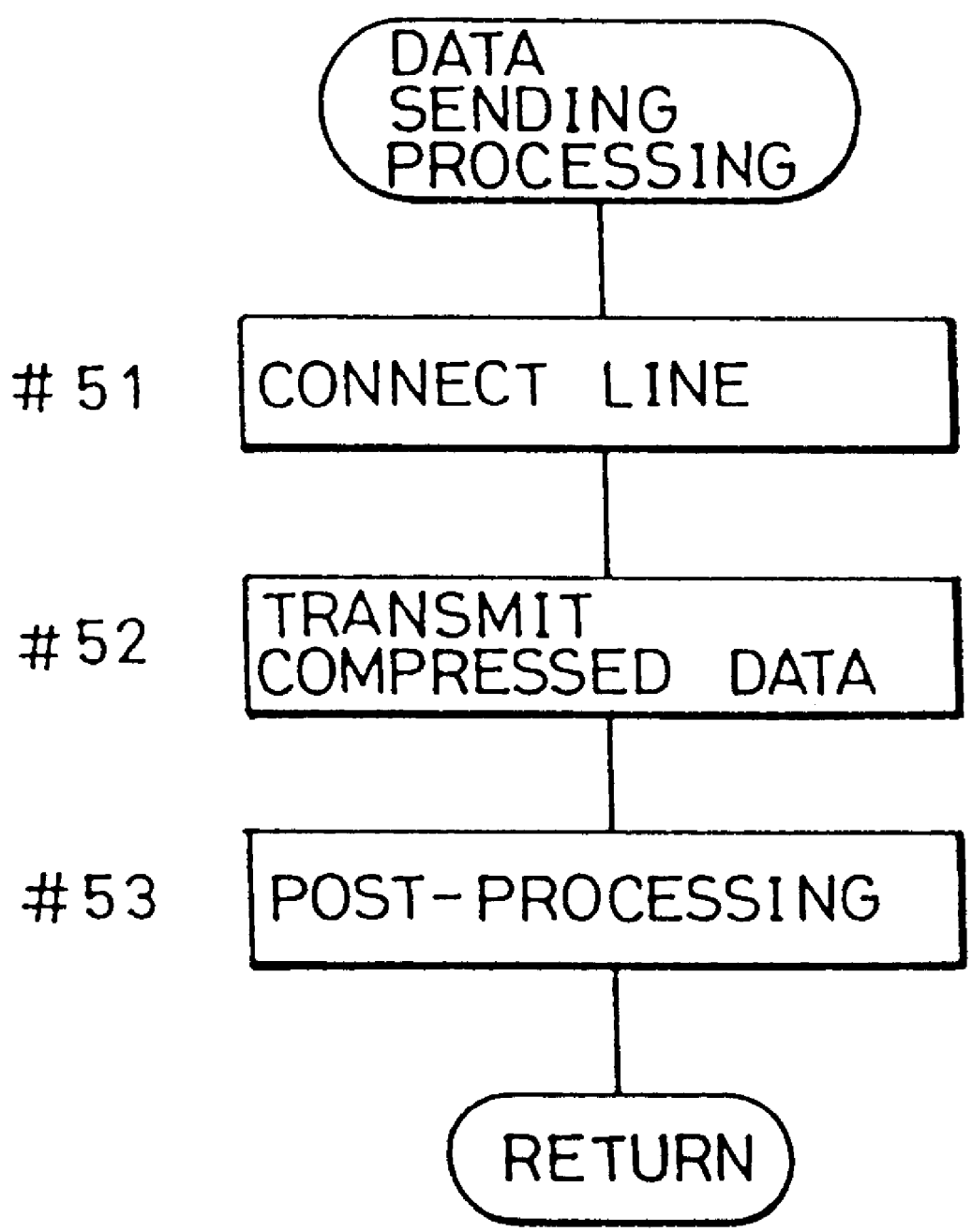
FIG. 14 is a flow chart showing specific contents of a data sending processing routine of FIG. 11.

FIG. 14 is a flow chart showing the specific contents of a data transmission processing of FIG. 11.

After calling a facsimile apparatus on a destination side by the NCU 302 to connect a line (#51), the compressed data read from the code memory 136 is modulated by the modem 301 and transmitted to a communication line (#52). When transmission is finished, a post-processing for releasing connection with the called party is executed (#53).

Figure 15:
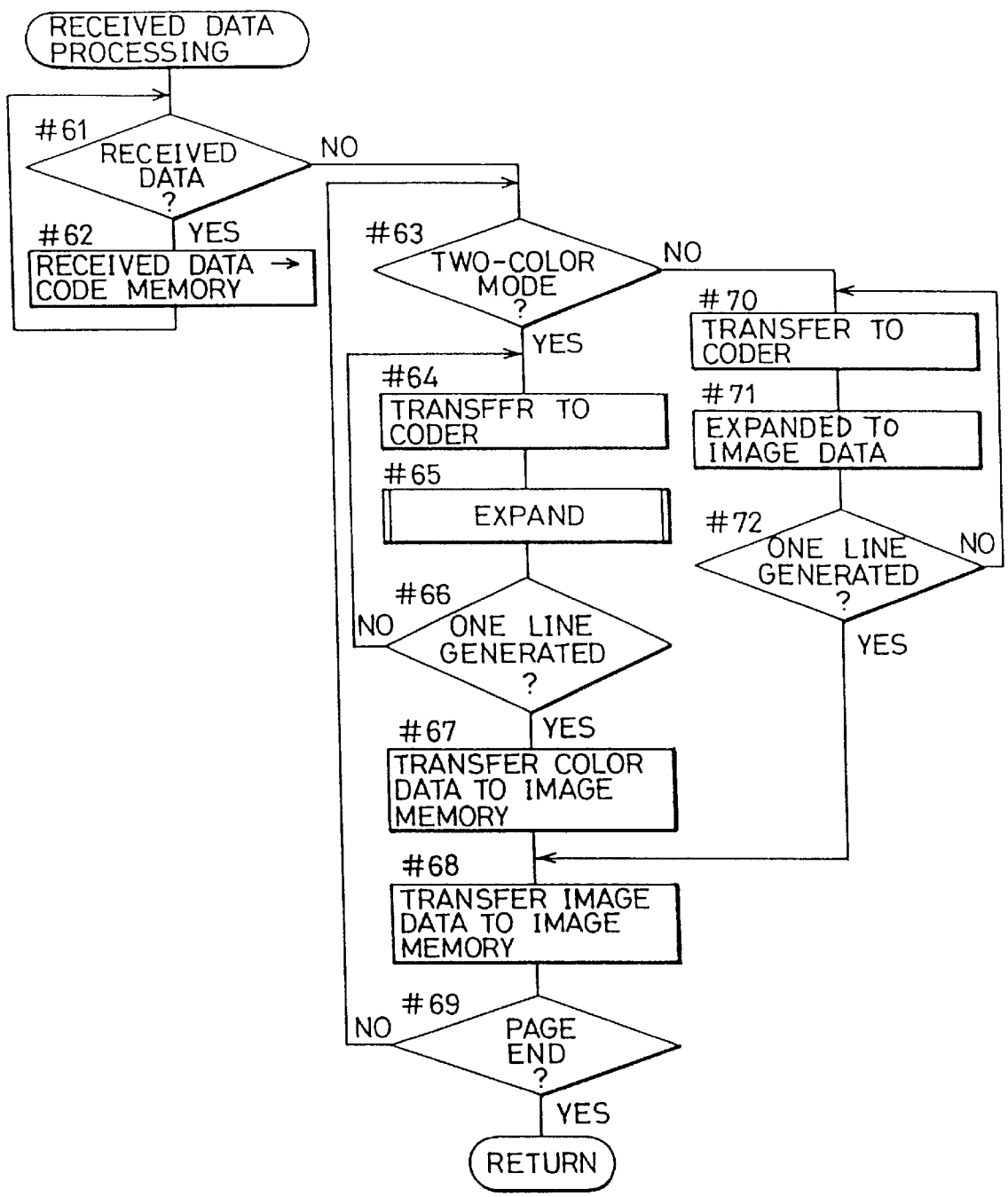
FIG. 15 is a flow chart showing specific contents of a received data processing routine of FIG. 11.

FIG. 15 is a flow chart showing the specific contents of the received data processing of FIG. 11. First, the received compressed data is written in the code memory 136 (#61, #62). In the two-color mode (YES at #63), the compressed data is transferred from the code memory 136 to the coder 146 (#64).

Then, when an expansion processing is executed under the present invention system (#65) to obtain image data of one line in a line buffer inside the coder 146 (YES at #66), color data of the line is transferred to a sign bit of the image memory 156 (#67), the image data is transferred to the image memory 156 (#68) and the same processings are sequentially performed for image data of a subsequent line. Upon completion of a page (YES at #69), the flow returns.

When not in the two-color mode (NO at #63), compressed data is transferred from the code memory 136 to the coder 146 (#70), an expansion processing is performed under the MH system (#71). When image data of one line is obtained (YES at #72), image data is transferred to the image memory 156 (#68) and the same processings are sequentially performed for image data of a subsequent line.

Figure 16:
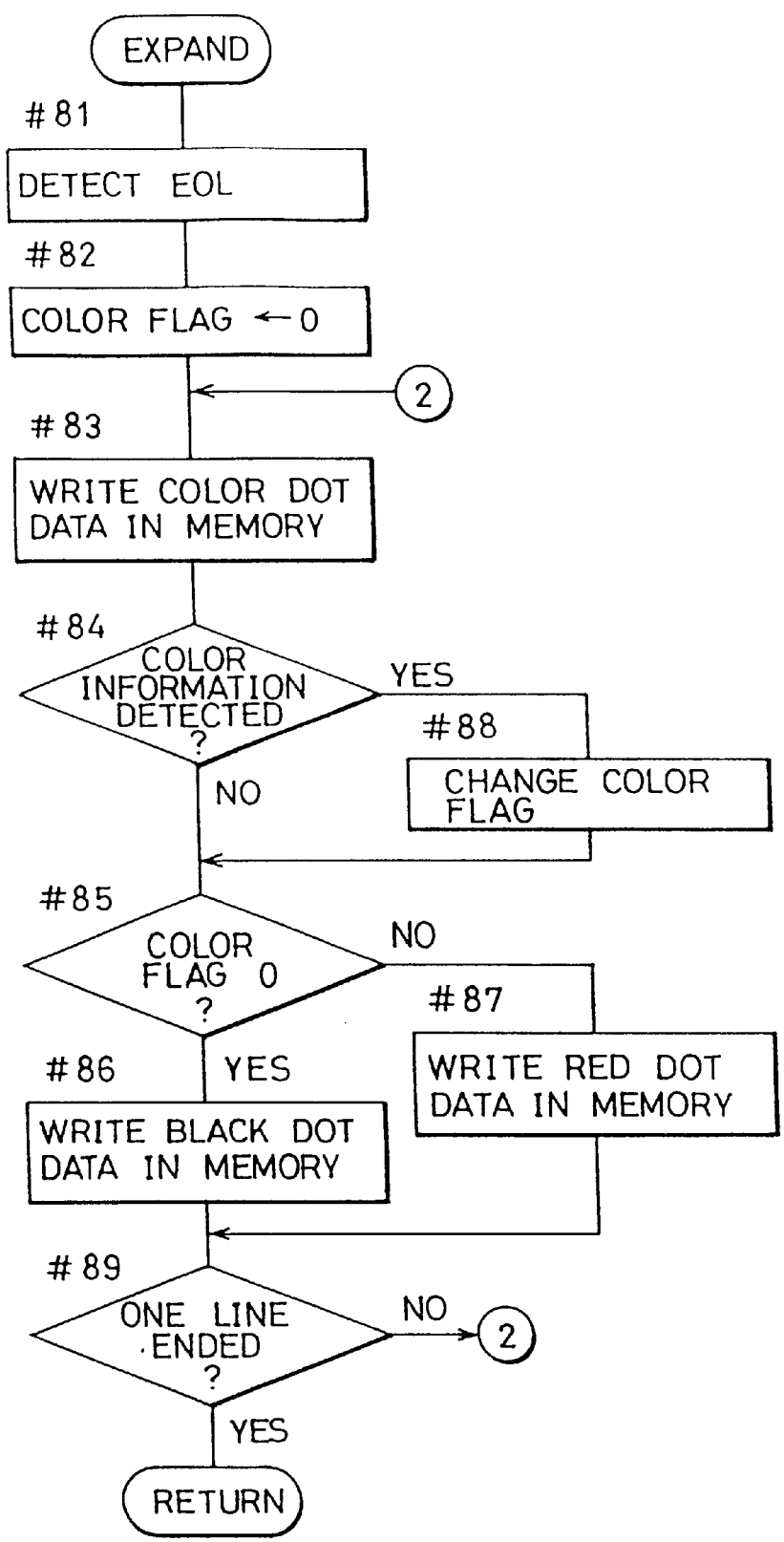
FIG. 16 is a flow chart showing specific contents of an expansion processing routine of FIG. 15.

FIG. 16 is a flow chart showing the specific contents of the expansion processing of FIG. 15.

First, an EOL code is detected (#81) and a color flag is set to "0" to initialize the data color of the pixel to black (#82).

Then, the code table for white runs is searched based on compressed data to detect a length of the white run and dot data (image data) of the result is written in a buffer memory (#83).

Then, black data is expanded. When the compressed data includes color information CI ("black 0 white 0", for example), (YES at #84), a bit state of a color flag is changed (#88). If no color information is included, the code table for black runs is searched based on the compressed data to detect a length of the black run and dot data of the result is written in the buffer memory without changing the bit state (#86, #87). In this case, black dot data, when the color flag is "0" (YES at #85 goes to #86) and red dot data, when the color flag is "1" (#87), are respectively written. Upon completion of dot data of one line (YES at #89), the flow returns.

Figure 17:
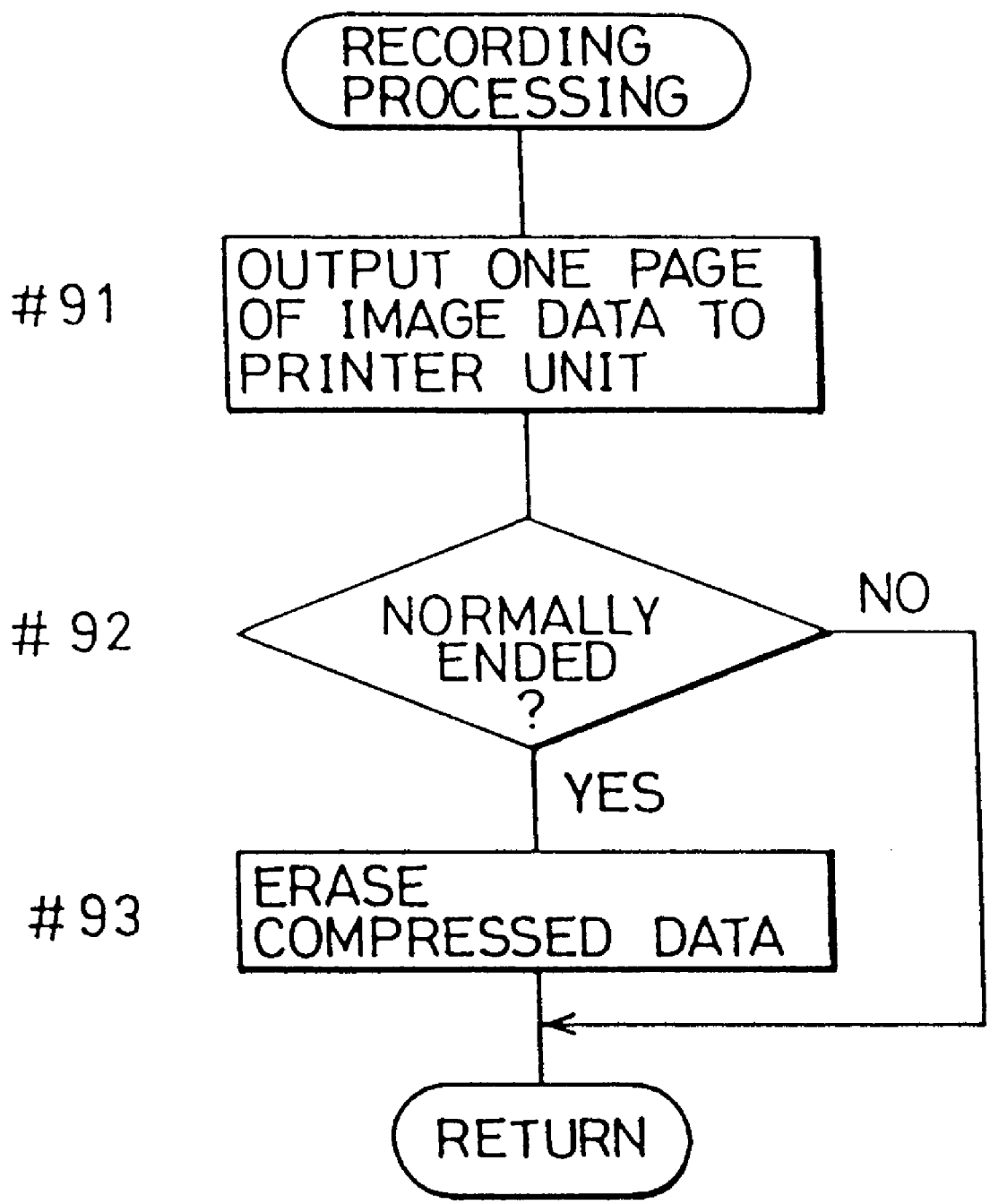
FIG. 17 is a flow chart showing specific contents of a recording processing routine of FIG. 11.

FIG. 17 is a flow chart showing the specific contents of a recording processing of FIG. 11.

One page of image data written in the image memory 156 is read and sent to the printing processing unit 40 (#91).

When transmission of the image data is normally finished (YES at #92), received compressed data is erased (#93). When the transmission is not finished normally, the flow returns.

Figure 18:
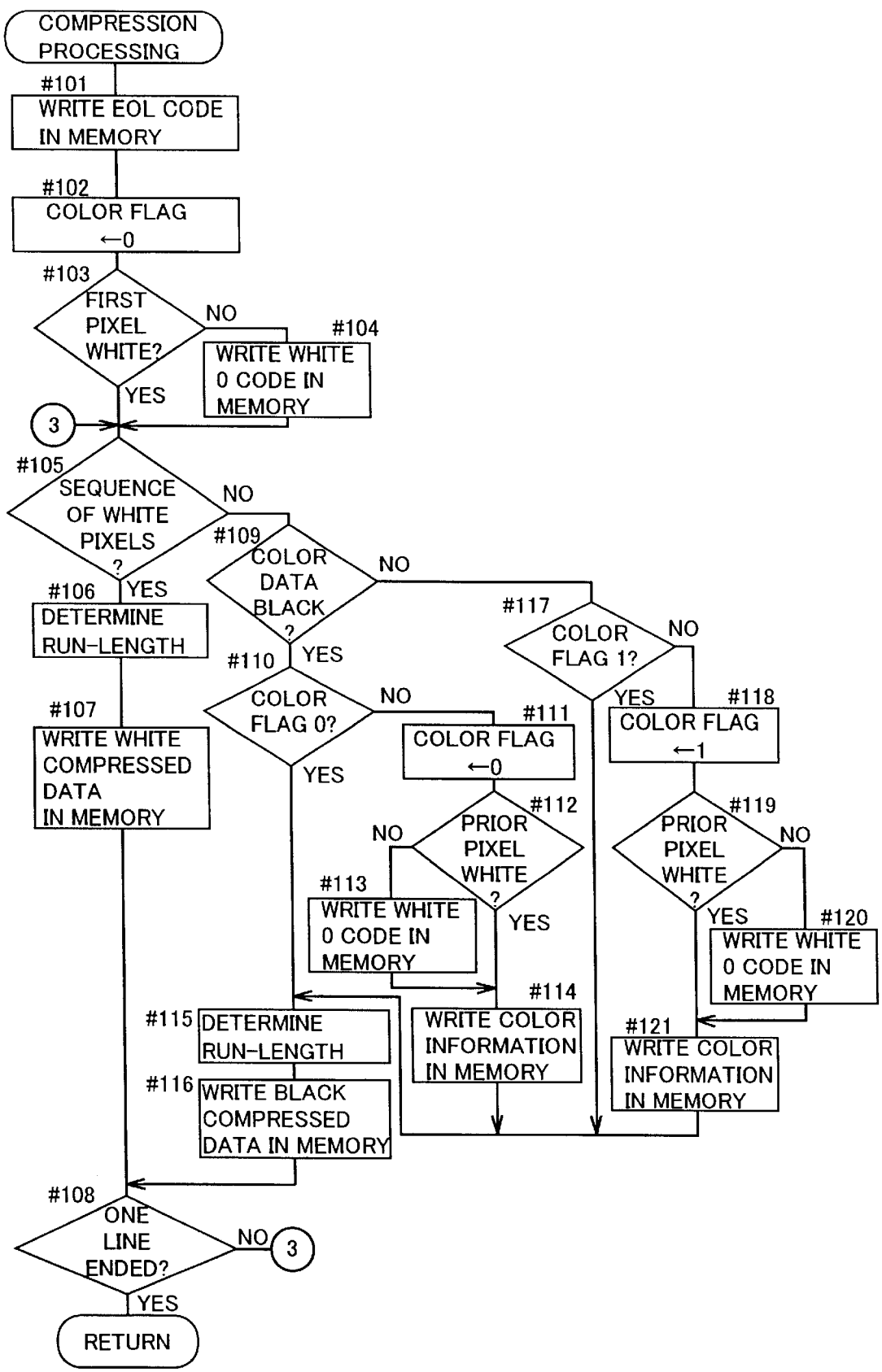
FIG. 18 is a flow chart showing specific contents of another example of a compression processing routine of FIG. 12.

FIG. 18 is a flow chart showing another example of a compression processing at step #15 of FIG. 12. This flow chart shows a compression processing in a case of color designation for image data performed on an pixel basis as shown in FIG. 3.

First, EOL code is created and written in the code memory 136 (#101). Then, a color flag is set to "0" to initialize the data color of the pixel to black (#102).

It is determined whether a first pixel is a white pixel (#103). If it is not a white pixel, a codeword indicative of a white run "0" is written in the code memory 136 (#104).

Then, a sequence of pixels is checked (#105). If the sequence is made of white pixels, after determining a run-length (#106), compressed data of the white run is generated based on the code table of the MH system and written in the code memory 136 (#107) to repeat these processings (#108). If the sequence is not made up of white pixels, color data of a sign bit determines whether a pixel is black or red (#109). When it is black, if a color flag is not "0" (NO at #110) the flag is set to "0" (#111) to determine whether the prior pixel is a white pixel or not (#112). If the prior pixel is not a white pixel, black information continuously goes erroneous, so that the code "white 0" is once written in the code memory (#113). Then, after writing the color information CI in the code memory 136 (#114) to determine a run-length (#115), the compressed data of the black run is generated and written in the code memory 136 (#116).

When the color data denotes red (NO at #109), if the color flag is not "1", (NO at #117) "1" is set (#118) to determine whether the prior pixel is a white pixel or not (#119). If the prior pixel is not a white pixel, black information goes continuously erroneous, so that a code "white 0" is once written in the code memory (#120). Then, the color information CI is written in the code memory 136 (#121) to repeat the same processings hereinafter.

According to the above-described embodiments, data obtained by compressing image data of two-color image under the present invention system can be transmitted to and expanded by an apparatus on a destination side even if the apparatus is of the MH system. The embodiments also allow the facsimile apparatus 1 to expand, under the present invention system, the data obtained by compressing by the destination side apparatus under the MH system. In other words, the facsimile apparatus 1 of the present invention system allows normal transmission to and from a facsimile apparatus of the MH system not capable of receiving two-color image.

Although in the above-described embodiments, description is made of sending and receiving of two-color image of black and white, image made of a combination of arbitrary two colors such as black and blue or blue and red is also possible. The embodiment is also applicable to full color image data of two or more colors, for example, three colors. The coding system of the present invention is also applicable to other apparatus than a facsimile apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coding method for color image data including the steps of:

providing signals including image data on a transmitting side, coding the image data by replacing the image data with codewords indicative of a white run-length or a black run-length, representing color information of a color other than white or black by combining specific codewords among said codewords, and representing image data including color image data for said color other than white or black by only said codewords by combining said coded image data and said color information to be transmitted to a receiving side according to a standard black and white mode in the absence of a special color mode at the receiving side.

2. The coding method according to claim 1, wherein said specific codewords include codewords substantially indicative of no image.

3. The coding method according to claim 2, wherein said color information is represented by a combination of a codeword of "black 0" and a codeword of "white 0".

4. The coding method according to claim 1, wherein said color information is represented by a combination of a codeword of "black 1" and a codeword of "white 0".

5. A facsimile apparatus including:

original reading means for reading image data from an original on a transmitting side, color determining means for determining color of said read image data, coding means for coding said read image data by replacing said image data with codewords indicative of a white run-length or a black run-length, said coded image data including color information of a color other than white or black represented by a combination of specific codewords among said codewords, and outputting means for outputting said coded image data to be transmitted to a receiving side according to a standard black and white mode in the absence of a special color mode at the receiving side.

6. The facsimile apparatus according to claim 5, wherein said specific codewords include codewords substantially indicative of no image.

7. The facsimile apparatus according to claim 6, wherein said color information is represented by a combination of a codeword of "black 0" and a codeword of "white 0".

8. The facsimile apparatus according to claim 5, wherein said color information is represented by a combination of a codeword of "black 1" and a codeword of "white 0".

9. A facsimile apparatus including:

receiving means for receiving transmitted image data on a receiving side, the image data being coded by being replaced with codewords indicative of a white run-length or a black run-length, color information determining means for determining color information of a color other than white or black represented by a combination of specific codewords among said codewords in said received image data, and outputting means for outputting said received image data as specific color image data when said color information is determined to be transmitted to the receiving side according to a standard black and white mode in the absence of a special color mode at the receiving side.

10. The facsimile apparatus according to claim 9, wherein output by said outputting means is performed in a color specified for each line.

11. The facsimile apparatus according to claim 10, wherein output by said outputting means is performed by recognizing color information disposed on the head of data in each line.

12. The facsimile apparatus according to claim 9, wherein said outputting means, at each determination of said color information, outputs image data subsequent to the color information as specific color image data.

13. A facsimile apparatus comprising:

an image reader for reading an original image on a transmitting side, and for outputting an image signal representing color of each pixel of the original image;

compressing means for compressing the image signal by replacing the image signal with a codeword; and transmitting means for transmitting codewords from said compressing means, wherein said compressing means replaces the image signal with a codeword indicative of a white run-length when the image signal represents a white image, replaces the image signal with a codeword indicative of a black run-length when the image signal represents an image of a first non-white color, and replaces the image signal with a combination of codewords indicative of specific white or black run-lengths and a codeword indicative of a black run-length when the image signal represents an image of a second non-white color different from the first non-white color to be transmitted to a receiving side according to a standard black and white mode in the absence of a special color mode at the receiving side.

14. The facsimile apparatus according to claim 13, wherein the combination of codewords consists of codewords substantially indicative of no image.

15. The facsimile apparatus according to claim 14, wherein the combination of codewords consists of the codeword indicative of "black 1" and the codeword indicative of "white 0".

16. The facsimile apparatus according to claim 14, wherein the combination of codewords consists of the codeword indicative of "black 1" and the codeword indicative of "white 0".

17. The facsimile apparatus according to claim 13, wherein said image reader includes image signal processing means for processing image signals to identify respective pixels with the first color and the second color, and for outputting image data with color data, and wherein said compressing means determines, on the basis of the color data, whether or not the combination of codewords is given.

18. A facsimile apparatus comprising:

receiving means for receiving compressed image data on a receiving side;

determining means for determining whether or not the compressed image data includes a combination of codewords indicative of specific black or white run-lengths;

expanding means for expanding the compressed image data to an image signal representing an image of a first non-white color when the compressed image data does not include the combination of codewords, and to an image signal representing an image of a second non-white color different from the first non-white color when the compressed image data includes the combination of codewords; and image forming means for forming an image which has the first non-white color and the second non-white color on the basis of the image signal expanded by said expanding means when said compressed image data is determined to be transmitted to the receiving side according to a standard black and white mode in the absence of a special color mode at the receiving side.

* * * * *